(12) United States Patent
Abe et al.

(10) Patent No.: US 10,044,286 B2
(45) Date of Patent: Aug. 7, 2018

(54) POWER CONVERSION SYSTEM INCLUDING PLURALITY OF POWER CONVERTERS CONNECTED IN PARALLEL TO LOAD

(71) Applicant: TOSHIBA MITSUBISHI-ELECTRIC INDUSTRIAL SYSTEMS CORPORATION, Chuo-ku (JP)

(72) Inventors: Shoichi Abe, Chuo-ku (JP); Masahiro Kinoshita, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 285 days.

(21) Appl. No.: 15/000,332

(22) Filed: Jan. 19, 2016

(65) Prior Publication Data
US 2017/0012549 A1     Jan. 12, 2017

(30) Foreign Application Priority Data

Jul. 8, 2015  (JP) ................................. 2015-136828

(51) Int. Cl.
*H02J 9/06*      (2006.01)
*H02M 5/458*    (2006.01)
(Continued)

(52) U.S. Cl.
CPC .............. *H02M 5/458* (2013.01); *H02H 7/10* (2013.01); *H02J 9/062* (2013.01); *H02M 1/126* (2013.01);
(Continued)

(58) Field of Classification Search
CPC ...... Y10T 307/62; Y10T 307/707; H02J 3/38; H02J 9/062; H02J 1/102
See application file for complete search history.

(56) References Cited

U.S. PATENT DOCUMENTS

2005/0162137 A1*  7/2005  Tracy ...................... H02J 9/062
                                                                         323/217
2010/0045108 A1*  2/2010  Hu ....................... H02M 5/4585
                                                                         307/31
(Continued)

FOREIGN PATENT DOCUMENTS

JP      2007-74823      3/2007
JP      2013-247724     12/2013

OTHER PUBLICATIONS

Japanese Office Action dated May 23, 2018 for Japanese Patent Application No. 2015-136828, and English translation thereof.

*Primary Examiner* — Fritz M Fleming
(74) *Attorney, Agent, or Firm* — Oblon, McClelland, Maier & Neustadt, L.L.P.

(57) ABSTRACT

An uninterruptible power supply system includes a plurality of uninterruptible power supply devices, and each uninterruptible power supply device includes a conversion circuit, an inversion circuit, a DC positive bus, a DC negative bus, and a capacitor. The uninterruptible power supply system includes a first fuse connected between DC positive buses of two uninterruptible power supply devices, and a second fuse connected between DC negative buses of the two uninterruptible power supply devices. DC voltages between the plurality of DC positive buses and between the plurality of DC negative buses can be made uniform and a cross current can be suppressed. Even when one uninterruptible power supply device fails and an overcurrent flows between the two DC positive buses and between the two DC negative buses, the failure range can be narrowly limited by the first and second fuses.

11 Claims, 6 Drawing Sheets

(51) Int. Cl.
*H02M 1/12* (2006.01)
*H02H 7/10* (2006.01)
*H02M 3/158* (2006.01)
*H02M 7/5387* (2007.01)

(52) U.S. Cl.
CPC ....... *H02M 3/1588* (2013.01); *H02M 5/4585* (2013.01); *H02M 7/5387* (2013.01); *Y02B 70/1466* (2013.01)

(56) References Cited

U.S. PATENT DOCUMENTS

| | | | |
|---|---|---|---|
| 2014/0192570 A1* | 7/2014 | Nielsen | H02J 1/102 363/50 |
| 2016/0056667 A1* | 2/2016 | Konishi | H02J 9/062 307/66 |

* cited by examiner

POWER CONVERSION SYSTEM INCLUDING PLURALITY OF POWER CONVERTERS CONNECTED IN PARALLEL TO LOAD

BACKGROUND OF THE INVENTION

Field of the Invention

The present invention relates to a power conversion system, and particularly to a power conversion system including a plurality of power converters connected in parallel to a load.

Description of the Background Art

An uninterruptible power supply system including a plurality of uninterruptible power supply devices connected in parallel to a load has been conventionally known. Each uninterruptible power supply device includes a conversion circuit for converting an AC voltage supplied from an AC power supply into a DC voltage, an inversion circuit for converting the DC voltage into an AC voltage and providing the AC voltage to a load, and a DC bus for supplying the DC voltage generated by the conversion circuit to the inversion circuit.

At the normal time when the AC power is supplied from the AC power supply, the AC power is converted into the DC power by the conversion circuit and the DC power is stored in a power storage device, and further, the DC power is converted into the AC power by the inversion circuit and the AC power is supplied to the load. At the time of a power failure when supply of the AC power from the AC power supply is stopped, the DC power of the power storage device is converted into the AC power by the inversion circuit and the AC power is supplied to the load. Therefore, even when a power failure occurs, the operation of the load can be continued during a time period in which the DC power is stored in the power storage device.

Japanese Patent Laying-Open No. 2007-74823 discloses a power converter including a DC positive bus, a DC negative bus, two fuses, and two inverter units. Each inverter unit includes a capacitor and a semiconductor module connected in parallel to each other. A positive side terminal of the semiconductor module is connected to the DC positive bus with the fuse interposed therebetween, and a negative side terminal of the semiconductor module is connected to the DC negative bus. When the semiconductor module of the inverter unit fails and becomes short-circuited, an overcurrent flows and the fuse is blown.

However, the conventional uninterruptible power supply system had a problem that output voltages of the plurality of inversion circuits vary and a cross current flows between output terminals of the plurality of inversion circuits. As a method for dealing with this, it is conceivable to suppress the variation of the output voltages of the plurality of inversion circuits by short-circuiting the plurality of DC buses and making input voltages of the plurality of inversion circuits uniform. According to this method, however, when the conversion circuit or the like of one uninterruptible power supply device fails and becomes short-circuited, it is assumed that an overcurrent flows from the other uninterruptible power supply devices to the short-circuited portion and the other uninterruptible power supply devices also fail.

SUMMARY OF THE INVENTION

Thus, a main object of the present invention is to provide a power conversion system that allows a cross current to be reduced and a failure range to be narrowly limited.

A power conversion system according to the present invention includes: first to N-th power converters connected in parallel to a load; and first to (N−1)-th fuses. N is an integer equal to or larger than 2. Each power converter includes: a conversion circuit for converting an AC voltage into a DC voltage; an inversion circuit for converting the DC voltage into an AC voltage and providing the AC voltage to the load; a DC bus for supplying the DC voltage from the conversion circuit to the inversion circuit; and a capacitor connected to the DC bus, for smoothing the DC voltage. An n-th fuse is connected between the DC bus of an n-th power converter and the DC bus of a (n+1)-th power converter. n is an integer equal to or larger than 1 and equal to or smaller than (N−1).

In the power conversion system according to the present invention, the DC buses of the two power converters are connected by the fuse. Therefore, input voltages of the plurality of inversion circuits can be made uniform and a cross current flowing between the plurality of inversion circuits can be suppressed. Furthermore, when the conversion circuit or the like of one power converter fails and an overcurrent flows between the DC bus of another power converter and the DC bus of the failed power converter, the fuse is blown and the two DC buses are electrically separated. Therefore, it is possible to prevent the other power converters from failing when one power converter fails, and to narrowly limit the failure range.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

[First Embodiment]

Figure 1:
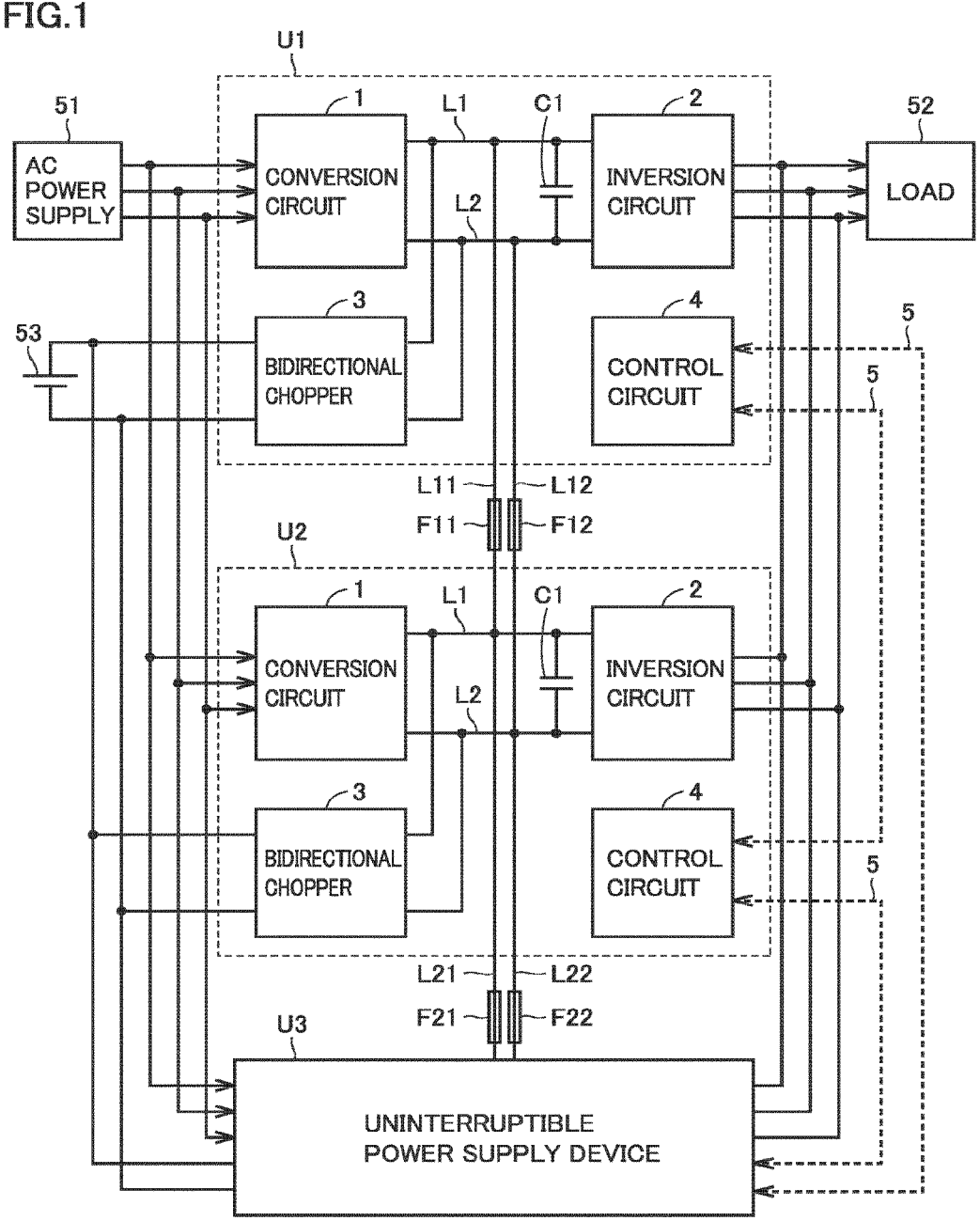
FIG. 1 is a circuit block diagram showing a configuration of an uninterruptible power supply system according to a first embodiment of the present invention.

FIG. 1 is a circuit block diagram showing a configuration of an uninterruptible power supply system (power conversion system) according to a first embodiment of the present invention. In FIG. 1, this uninterruptible power supply system includes a plurality of (three in the figure) uninterruptible power supply devices (power converters) U1 to U3 connected in parallel between an AC power supply 51 and a load 52. One battery 53 (power storage device) common to three uninterruptible power supply devices U1 to U3 is provided. AC power supply 51 supplies the three-phase AC power of a commercial frequency to uninterruptible power supply devices U1 to U3. Load 52 is driven by the three-phase AC power of a commercial frequency supplied from uninterruptible power supply devices U1 to U3. Battery 53 stores the DC power. Instead of battery 53, a capacitor may be provided.

Each of uninterruptible power supply devices U1 to U3 includes a conversion circuit 1, an inversion circuit 2, a bidirectional chopper 3, a control circuit 4, a DC positive bus L1, a DC negative bus L2, and a capacitor C1. Conversion circuit 1 generates a positive voltage and a negative voltage based on a three-phase AC voltage supplied from AC power supply 51. The positive voltage and the negative voltage generated by conversion circuit 1 are provided to inversion circuit 2 via DC positive bus L1 and DC negative bus L2, respectively. Capacitor C1 is connected between DC positive bus L1 and DC negative bus L2, for smoothing and stabilizing a DC voltage between buses L1 and L2.

Inversion circuit 2 generates a three-phase AC voltage of a commercial frequency based on the positive voltage and the negative voltage supplied from conversion circuit 1 via buses L1 and L2, and supplies the three-phase AC voltage to load 52. Bidirectional chopper 3 is connected between DC positive and negative buses L1, L2 and battery 53. At the normal time when the three-phase AC voltage is supplied from AC power supply 51, bidirectional chopper 3 steps down the DC voltage between buses L1 and L2 and supplies the stepped-down voltage to battery 53 to charge battery 53. At the time of a power failure when supply of the three-phase AC power from AC power supply 51 is stopped, bidirectional chopper 3 boosts a voltage between the terminals of battery 53 and supplies the boosted voltage to between buses L1 and L2 to discharge battery 53.

Control circuit 4 controls conversion circuit 1, inversion circuit 2 and bidirectional chopper 3 based on instantaneous values of the three-phase AC voltage supplied from AC power supply 51, the DC voltage between buses L1 and L2, the voltage between the terminals of battery 53, the three-phase AC voltage output from inversion circuit 2, a three-phase AC current flowing from inversion circuit 2 to load 52, and the like.

Control circuits 4 of uninterruptible power supply devices U1 to U3 are coupled to one another by a communication line 5 to transmit and receive various information including a load current. Control circuit 4 obtains a share current of the corresponding uninterruptible power supply device by dividing the sum of the load currents of uninterruptible power supply devices U1 to U3 by the number of operating uninterruptible power supply devices U, and controls the corresponding uninterruptible power supply device to output the share current.

Figure 2:
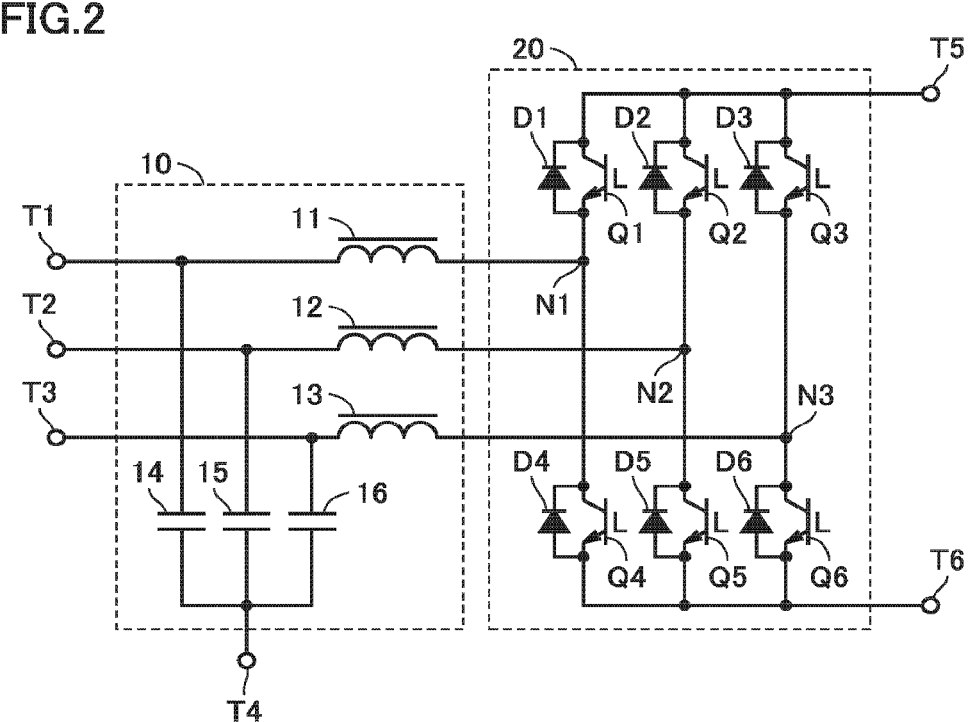
FIG. 2 is a circuit diagram showing a configuration of a power conversion circuit included in a conversion circuit and an inversion circuit shown in FIG. 1.

FIG. 2 is a circuit diagram showing a configuration of a power conversion circuit included in each of conversion circuit 1 and inversion circuit 2. In FIG. 2, the power conversion circuit includes AC terminals T1 to T3, a neutral point terminal T4, DC terminals T5 and T6, an AC filter 10, and a semiconductor module 20. AC terminals T1 to T3 are used to transmit and receive the three-phase AC voltage. Neutral point terminal T4 of conversion circuit 1 and neutral point terminal T4 of inversion circuit 2 are connected to each other. DC terminals T5 and T6 are used to transmit and receive the positive voltage and the negative voltage, respectively.

AC filter 10 includes reactors 11 to 13 and capacitors 14 to 16. One terminals of reactors 11 to 13 are connected to AC terminals T1 to T3, respectively, and the other terminals thereof are connected to nodes N1 to N3 of semiconductor module 20, respectively. One electrodes of capacitors 14 to 16 are connected to AC terminals T1 to T3, respectively, and the other electrodes thereof are all connected to neutral point terminal T4. AC filter 10 is a low-pass filter, and allows the three-phase AC power of a commercial frequency to pass therethrough and interrupts a signal of a switching frequency generated at semiconductor module 20.

Semiconductor module 20 includes transistors Q1 to Q6 and diodes D1 to D6. Each of transistors Q1 to Q6 is, for example, an IGBT (Insulated Gate Bipolar Transistor). Collectors of transistors Q1 to Q3 are all connected to DC terminal T5, and emitters thereof are connected to nodes N1 to N3, respectively. Collectors of transistors Q4 to Q6 are connected to nodes N1 to N3, respectively, and emitters thereof are all connected to DC terminal T6.

Anodes of diodes D1 to D6 are connected to the emitters of transistors Q1 to Q6, respectively, and cathodes thereof are connected to the collectors of transistors Q1 to Q6, respectively. Namely, diodes D1 to D6 are connected in antiparallel to transistors Q1 to Q6, respectively. Each of transistors Q1 to Q6 is PWM (pulse width modulation) controlled by control circuit 4, and is turned on/off at every prescribed timing in synchronization with the three-phase AC voltage from AC power supply 51. For example, transistors Q1 to Q3 are sequentially turned on/off in synchronization with the three-phase AC voltage. During a time period in which transistors Q1 to Q3 are ON, transistors Q4 to Q6 are OFF, and during a time period in which transistors Q1 to Q3 are OFF, transistors Q4 to Q6 are ON.

In conversion circuit 1, AC terminals T1 to T3 receive the three-phase AC voltage from AC power supply 51, and DC terminal T5 is connected to one end of DC positive bus L1 and DC terminal T6 is connected to one end of DC negative bus L2. AC filter 10 allows the three-phase AC power of a commercial frequency supplied from AC power supply 51 to pass through semiconductor module 20, and prevents the signal of a switching frequency generated at semiconductor module 20 from passing through AC power supply 51.

In conversion circuit 1, semiconductor module 20 forms a two-level converter that generates the positive voltage and the negative voltage based on the three-phase AC voltage supplied from AC power supply 51 via AC filter 10, and provides the generated positive voltage and negative voltage to DC terminals T5 and T6, respectively.

For example, when a voltage of AC terminal T1 is higher than a voltage of AC terminal T2, transistors Q1 and Q5 are turned on and a current flows through a path of AC terminal T1, reactor 11, transistor Q1, DC terminal T5, capacitor C1, DC terminal T6, transistor Q5, reactor 12, and AC terminal T2, and thus, capacitor C1 is charged.

In inversion circuit 2, AC terminals T1 to T3 are connected to load 52, and DC terminal T5 is connected to the other end of DC positive bus L1 and DC terminal T6 is connected to the other end of DC negative bus L2. Semiconductor module 20 forms a two-level inverter that generates the three-phase AC voltages based on the positive voltage and the negative voltage supplied from conversion circuit 1 or bidirectional chopper 3 via buses L1 and L2, and outputs the generated three-phase AC voltages to nodes N1 to N3, respectively. Each of the three-phase AC voltages generated by semiconductor module 20 is, for example, a two-level AC voltage that changes into a positive voltage, a negative voltage, a positive voltage, . . . .

For example, transistors Q1 and Q5 are turned on and a current flows through a path of DC terminal T5, transistor Q1, reactor 11, AC terminal T1, load 52, AC terminal T2, reactor 12, transistor Q5, and DC terminal T6, and thus, capacitor C1 is discharged.

In inversion circuit 2, AC filter 10 allows the three-phase AC voltage of a commercial frequency generated by semiconductor module 20 to pass through load 52, and prevents the signal of a switching frequency generated at semiconductor module 20 from passing through load 52. In other words, AC filter 10 of inversion circuit 2 converts the three-phase two-level AC voltage generated by semiconductor module 20 into a three-phase sinusoidal AC voltage and provides the three-phase sinusoidal AC voltage to load 52.

Figure 3:
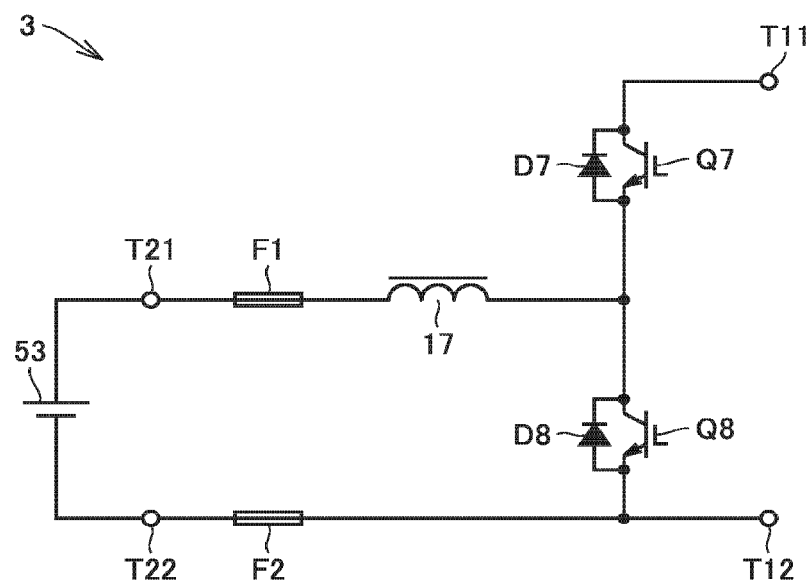
FIG. 3 is a circuit diagram showing a configuration of a bidirectional chopper shown in FIG. 1.

FIG. 3 is a circuit diagram showing a configuration of bidirectional chopper 3. In FIG. 3, bidirectional chopper 3 includes DC terminals T11 and T12, battery terminals T21 and T22, transistors Q7 and Q8, diodes D7 and D8, a reactor 17, and fuses F1 and F2. DC terminals T11 and T12 are connected to DC positive bus L1 and DC negative bus L2, respectively. Battery terminals T21 and T22 are connected to a positive electrode and a negative electrode of battery 53, respectively.

Each of transistors Q7 and Q8 is, for example, an IGBT. Transistors Q7 and Q8 are connected in series between DC terminals T11 and T12. Diodes D7 and D8 are connected in antiparallel to transistors Q7 and Q8, respectively. Reactor 17 and fuse F1 are connected in series between an emitter of transistor Q7 and battery terminal T21. Fuse F2 is connected between an emitter of transistor Q8 and battery terminal T22.

In the case of charging battery 53, transistor Q8 is turned off and transistor Q7 is turned on/off at every prescribed cycle. When transistor Q7 is turned on, a current flows from a positive side electrode of capacitor C1 through transistor Q7, reactor 17, fuse F1, battery 53, and fuse F2 to a negative side electrode of capacitor C1, and thus, capacitor C1 is discharged and the electromagnetic energy is stored in reactor 17, and further, battery 53 is charged. When transistor Q7 is turned off, a current flows through a path of reactor 17, fuse F1, battery 53, fuse F2, and diode D8, and thus, the electromagnetic energy of reactor 17 is released and battery 53 is charged.

When the ON time of transistor Q7 per one cycle is lengthened, a voltage between battery terminals T21 and T22 is increased. When the ON time of transistor Q7 per one cycle is shortened, the voltage between battery terminals T21 and T22 is decreased. By adjusting the ON time of transistor Q7 per one cycle, the voltage between the terminals of battery 53 can be adjusted to a desired voltage. The voltage between the terminals of battery 53 becomes lower than a voltage between the terminals of capacitor C1.

In the case of discharging battery 53, transistor Q7 is turned off and transistor Q8 is turned on/off at every prescribed cycle. When transistor Q8 is turned on, a current flows from the positive electrode of battery 53 through fuse F1, reactor 17, transistor Q8, and fuse F2 to the negative electrode of battery 53, and thus, the electromagnetic energy is stored in reactor 17. When transistor Q8 is turned off, a current flows from the positive electrode of battery 53 through fuse F1, reactor 17, diode D7, capacitor C1, and fuse F2 to the negative electrode of battery 53, and thus, battery 53 is discharged and the electromagnetic energy of reactor 17 is released, and further, capacitor C1 is charged.

When the ON time of transistor Q8 per one cycle is lengthened, a voltage between DC terminals T11 and T12 is increased. When the ON time of transistor Q8 per one cycle is shortened, the voltage between DC terminals T11 and T12 is decreased. By adjusting the ON time of transistor Q8 per one cycle, the voltage between the terminals of capacitor C1 can be adjusted to a desired voltage. The voltage between the terminals of capacitor C1 becomes higher than the voltage between the terminals of battery 53. When an overcurrent flows through battery 53, fuses F1 and F2 are blown to protect battery 53, bidirectional chopper 3 and the like.

Referring again to FIG. 1, the uninterruptible power supply system further includes fuses F11, F12, F21, and F22, and wirings L11, L12, L21, and L22. Fuse F11 is connected between DC positive buses L1 of uninterruptible power supply devices U1 and U2 by wiring L11. Fuse F12 is connected between DC negative buses L2 of uninterruptible power supply devices U1 and U2 by wiring L12. Fuse F21 is connected between DC positive buses L1 of uninterruptible power supply devices U2 and U3 by wiring L21. Fuse F22 is connected between DC negative buses L2 of uninterruptible power supply devices U2 and U3 by wiring L22.

Fuses F11 and F21 and wirings L11 and L21 connect DC positive buses L1 of uninterruptible power supply devices U1 to U3 to one another, to match the voltages of DC positive buses L1 of uninterruptible power supply devices U1 to U3 with one another. Fuses F12 and F22 and wirings L12 and L22 connect DC negative buses L2 of uninterruptible power supply devices U1 to U3 to one another, to match the voltages of DC negative buses L2 of uninterruptible power supply devices U1 to U3 with one another. As a result, input voltages of inversion circuits 2 of uninterruptible power supply devices U1 to U3 can be matched with one another, and a cross current flowing between the output terminals of inversion circuits 2 of uninterruptible power supply devices U1 to U3 can be suppressed to a small value.

When conversion circuit 1, inversion circuit 2, bidirectional chopper 3 or the like of uninterruptible power supply device U1 or U2 fails and a short circuit occurs between buses L1 and L2 and an overcurrent flows between buses L1, L2 of uninterruptible power supply device U1 and buses L1, L2 of uninterruptible power supply device U2, fuses F11 and F12 are blown to protect the uninterruptible power supply system.

For example, when transistor Q4 is turned on in the case where transistor Q1 included in semiconductor module 20 of conversion circuit 1 of uninterruptible power supply device U1 fails and is fixed to a conducting state, a short circuit occurs between buses L1 and L2 by transistors Q1 and Q4. When buses L1 and L2 of uninterruptible power supply device U1 are short-circuited, an overcurrent flows, for example, from the positive side electrode of capacitor C1 of uninterruptible power supply device U2 through fuse F11, the short-circuited portion (transistors Q1 and Q4) of uninterruptible power supply device U1, and fuse F12 to the negative side electrode of capacitor C1 of uninterruptible power supply device U2, and thus, at least one of fuses F11 and F12 is blown and the overcurrent is interrupted.

Similarly, when conversion circuit 1, inversion circuit 2 or the like of uninterruptible power supply device U2 or U3 fails and a short circuit occurs between buses L1 and L2 and an overcurrent flows between buses L1, L2 of uninterruptible power supply device U2 and buses L1, L2 of uninterruptible power supply device U3, fuses F21 and F22 are blown to protect the uninterruptible power supply system. Therefore, the failure range can be narrowly limited by fuses F11, F12, F21, and F22.

When the uninterruptible power supply system is normal, a current flowing through each of fuses F11, F12, F21, and F22 is sufficiently smaller than a rated current of each of uninterruptible power supply devices U1 to U3. Therefore, a rated interrupting current value of each of fuses F11, F12, F21, and F22 is smaller than a rated current value of each of uninterruptible power supply devices U1 to U3. When the current flowing through fuse F exceeds the rated interrupting current value, fuse F is blown and the current flowing through fuse F is interrupted.

Furthermore, an allowable current value of wirings L11 and L21 for connecting fuses F11 and F21 to DC positive bus L1 is smaller than an allowable current value of DC positive bus L1, and an allowable current value of wirings L12 and L22 for connecting fuses F12 and F22 to DC negative bus L2 is smaller than an allowable current value of DC negative bus L2. When the current flowing through the wiring exceeds the allowable current value, the wiring generates heat.

Next, the operation of this uninterruptible power supply system will be described. At the normal time when the three-phase AC power is normally supplied from AC power supply 51, the three-phase AC power from AC power supply 51 is converted into the DC power by conversion circuit 1 in each of uninterruptible power supply devices U1 to U3. The DC power generated by conversion circuit 1 is stored in battery 53 by bidirectional chopper 3, and further, the DC power is converted into the three-phase AC power by inversion circuit 2 and the three-phase AC power is supplied to load 52.

At the time of a power failure when supply of the three-phase AC power from AC power supply 51 is stopped, the operation of conversion circuit 1 is stopped in each of uninterruptible power supply devices U1 to U3. The DC power of battery 53 is supplied to inversion circuit 2 via bidirectional chopper 3 and converted into the three-phase AC power and the three-phase AC power is supplied to load 52. Therefore, the operation of load 52 can be continued during a time period in which the DC power is stored in battery 53.

In this first embodiment, DC positive buses L1 of uninterruptible power supply devices U1 to U3 are connected to one another and DC negative buses L2 thereof are connected to one another and the DC voltages input to inversion circuits 2 of uninterruptible power supply devices U1 to U3 are uniform. Therefore, a cross current flowing between the output terminals of inversion circuits 2 of uninterruptible power supply devices U1 to U3 is suppressed to a small value.

For example, when conversion circuit 1 of uninterruptible power supply device U1 fails and a short circuit occurs between buses L1 and L2, at least one of fuses F11 and F12 is blown and buses L1 and L2 of uninterruptible power supply device U1 are electrically separated from buses L1 and L2 of uninterruptible power supply devices U2 and U3. Therefore, even when one of three uninterruptible power supply devices U1 to U3 connected in parallel fails, a failure of the other uninterruptible power supply devices can be prevented and the failure range of the uninterruptible power supply system can be narrowly limited.

Furthermore, the rated interrupting current value of each of fuses F11, F12, F21, and F22 is selected to be smaller than the rated current value of each of uninterruptible power supply devices U1 to U3. The allowable current value of each of wirings L11 and L21 for connecting fuses F11 and F21 to DC positive bus L1 is selected to be smaller than the allowable current value of DC positive bus L1. The allowable current value of each of wirings L12 and L22 for connecting fuses F12 and F22 to DC negative bus L2 is selected to be smaller than the allowable current value of DC negative bus L2. Therefore, inexpensive and small-sized fuse F is used, and inexpensive and thin wirings L11, L12, L21, and L22 are used, and thus, reduction in size of the device, reduction in cost and simplification of the wiring work can be achieved.

In this first embodiment, description has been given to the case in which the present invention is applied to the uninterruptible power supply system including three uninterruptible power supply devices U1 to U3 connected in parallel. However, the present invention is not limited thereto. It goes without saying that the present invention is applicable to an uninterruptible power supply system including N uninterruptible power supply devices connected in parallel. N is an integer equal to or larger than 2. In this case, a fuse Fn1 is connected between DC positive bus L1 of an n-th uninterruptible power supply device Un and DC positive bus L1 of a (n+1)-th uninterruptible power supply device U(n+1), and a fuse Fn2 is connected between DC negative bus L2 of n-th uninterruptible power supply device Un and DC negative bus L2 of (n+1)-th uninterruptible power supply device U(n+1). n is an integer equal to or larger than 1 and equal to or smaller than (N−1).

Furthermore, in this first embodiment, fuse Fn1 is connected between two DC positive buses L1 and fuse Fn2 is connected between two DC negative buses L2. However, the present invention is not limited thereto. Any one fuse F of two fuses Fn1 and Fn2 may be replaced with a mere wiring. For example, fuse Fn1 may be connected between two DC positive buses L1 and two DC negative buses L2 may be connected only by a wiring Ln2. Conversely, DC positive buses L1 may be connected only by a wiring Ln1 and fuse Fn2 may be connected between two DC negative buses L2.

Furthermore, in this first embodiment, description has been given to the uninterruptible power supply system including the plurality of uninterruptible power supply devices U1 to U3. However, it goes without saying that the uninterruptible power supply device may be rephrased into a power conversion circuit, a power converting unit, an uninterruptible power supply circuit, or an uninterruptible power supply unit, and the uninterruptible power supply system may be rephrased into an uninterruptible power supply device. The plurality of uninterruptible power supply devices U1 to U3 may be housed in separate housings, or the plurality of uninterruptible power supply devices U1 to U3 may be housed in one housing.

Figure 4:
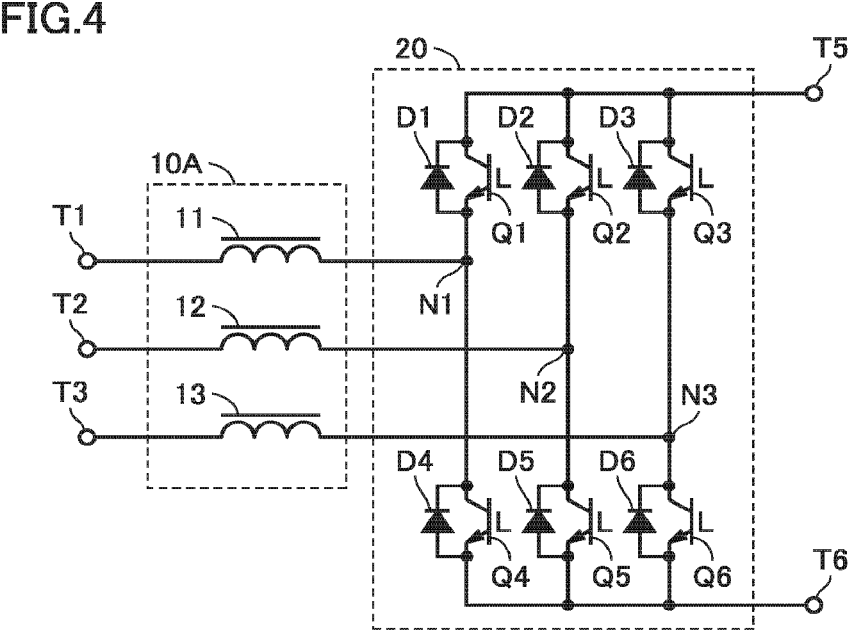
FIG. 4 is a circuit diagram showing a modification of the first embodiment.

FIG. 4 is a circuit diagram showing a configuration of a power conversion circuit of an uninterruptible power supply system which is a modification of the first embodiment, and FIG. 4 is contrasted with FIG. 2. Referring to FIG. 4, a difference between this power conversion circuit and the power conversion circuit in FIG. 2 is that AC filter 10 is replaced with an AC filter 10A and neutral point terminal T4 is removed. AC filter 10A is configured by removing capacitors 14 to 16 from AC filter 10. AC filter 10A forms a low-pass filter that allows the three-phase AC voltage of a commercial frequency to pass therethrough and interrupts the signal of a switching frequency generated at semiconductor module 20. In this modification, the same effect as that of the first embodiment can be obtained, and reduction in size of the device and reduction in cost can be achieved.

[Second Embodiment]

Figure 5:
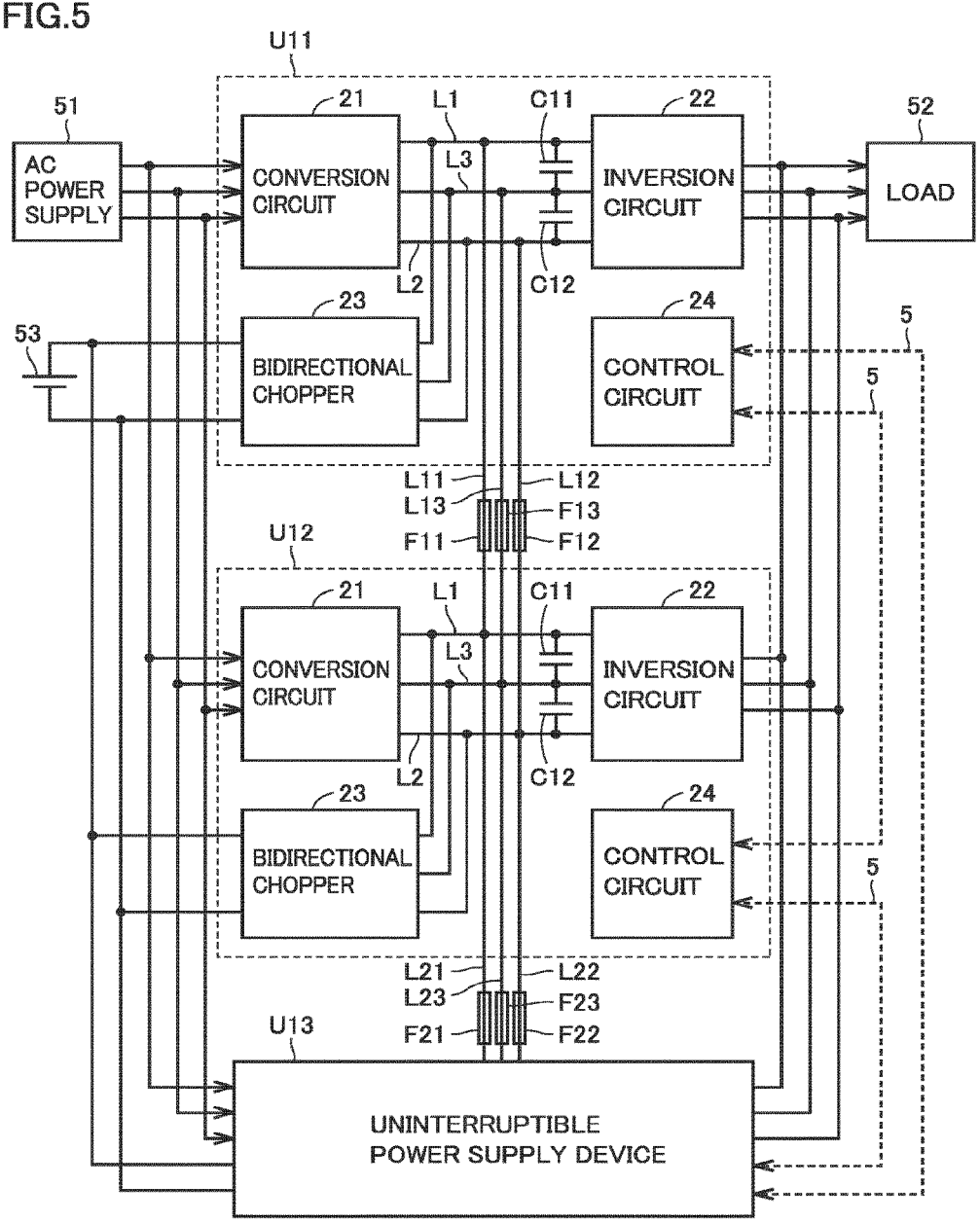
FIG. 5 is a circuit block diagram showing a configuration of an uninterruptible power supply system according to a second embodiment of the present invention.

FIG. 5 is a circuit block diagram showing a configuration of an uninterruptible power supply system according to a second embodiment of the present invention, and FIG. 5 is contrasted with FIG. 1. In FIG. 5, this uninterruptible power supply system includes a plurality of (three in the figure) uninterruptible power supply devices (power converters)

U11 to U13 connected in parallel between AC power supply 51 and load 52. One battery 53 (power storage device) common to three uninterruptible power supply devices U11 to U13 is provided. AC power supply 51 supplies the three-phase AC power of a commercial frequency to uninterruptible power supply devices U11 to U13. Load 52 is driven by the three-phase AC power of a commercial frequency supplied from uninterruptible power supply devices U11 to U13. Battery 53 stores the DC power. Instead of battery 53, a capacitor may be provided.

Each of uninterruptible power supply devices U11 to U13 includes a conversion circuit 21, an inversion circuit 22, a bidirectional chopper 23, a control circuit 24, DC positive bus L1, DC negative bus L2, a DC neutral point bus L3, and capacitors C11 and C12. Conversion circuit 21 generates a positive voltage, a negative voltage and a neutral point voltage based on a three-phase AC voltage supplied from AC power supply 51. The positive voltage, the negative voltage and the neutral point voltage generated by conversion circuit 21 are provided to inversion circuit 22 via DC positive bus L1, DC negative bus L2 and DC neutral point bus L3, respectively. Capacitor C11 is connected between DC positive bus L1 and DC neutral point bus L3, for smoothing and stabilizing a DC voltage between buses L1 and L3. Capacitor C12 is connected between DC neutral point bus L3 and DC negative bus L2, for smoothing and stabilizing a DC voltage between buses L2 and L3.

Inversion circuit 22 generates a three-phase AC voltage based on the positive voltage, the negative voltage and the neutral point voltage supplied from conversion circuit 21 via buses L1 to L3, and supplies the three-phase AC voltage to load 52. Bidirectional chopper 23 is connected between DC positive, negative and neutral point buses L1, L2, L3 and battery 53. At the normal time when the three-phase AC voltage is supplied from AC power supply 51, bidirectional chopper 23 steps down each of the DC voltage between buses L1 and L3 and the DC voltage between buses L3 and L2, and supplies the stepped-down voltages to battery 53 to charge battery 53. At the time of a power failure when supply of the three-phase AC power from AC power supply 51 is stopped, bidirectional chopper 23 boosts a voltage between the terminals of battery 53 and supplies the boosted voltage to between buses L1 and L3 and between buses L3 and L2 to discharge battery 53.

Control circuit 24 controls conversion circuit 21, inversion circuit 22 and bidirectional chopper 23 based on instantaneous values of the three-phase AC voltage supplied from AC power supply 51, the DC voltage in each of buses L1, L2 and L3, the voltage between the terminals of battery 53, the three-phase AC voltage output from inversion circuit 22, a three-phase AC current flowing from inversion circuit 22 to load 52, and the like.

Control circuits 24 of uninterruptible power supply devices U11 to U13 are coupled to one another by communication line 5 to transmit and receive various information including a load current. Control circuit 24 obtains a share current of the corresponding uninterruptible power supply device by dividing the sum of the load currents of uninterruptible power supply devices U11 to U13 by the number of operating uninterruptible power supply devices U, and controls the corresponding uninterruptible power supply device to output the share current.

Figure 6:
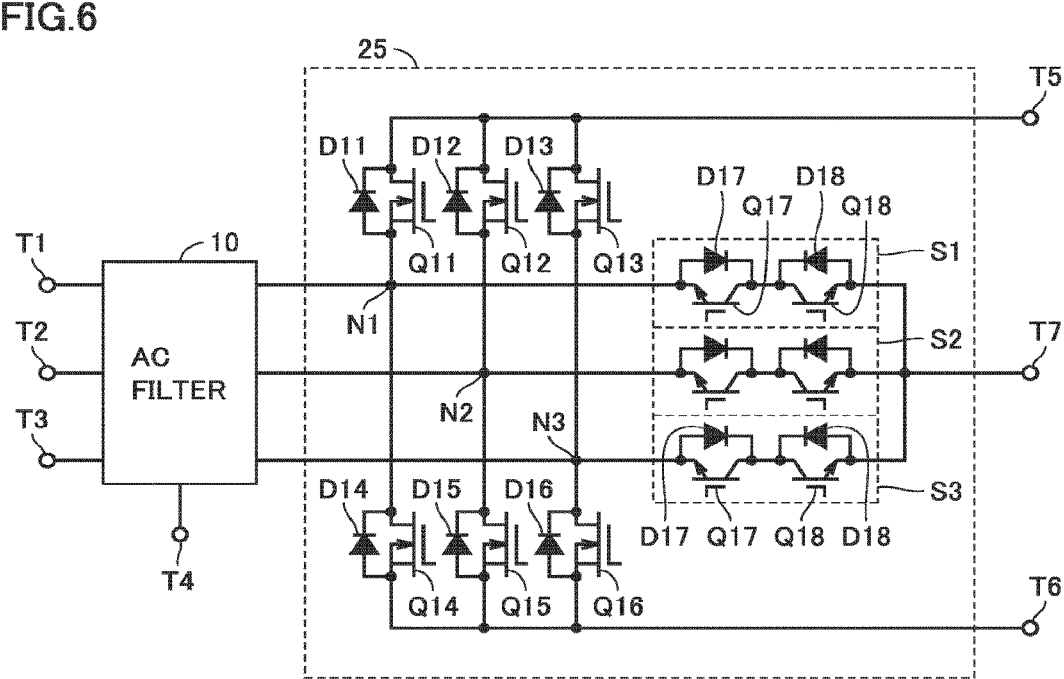
FIG. 6 is a circuit diagram showing a configuration of a power conversion circuit included in a conversion circuit and an inversion circuit shown in FIG. 5.

FIG. 6 is a circuit diagram showing a configuration of a power conversion circuit included in each of conversion circuit 21 and inversion circuit 22. In FIG. 6, the power conversion circuit includes AC terminals T1 to T3, neutral point terminal T4, DC terminals T5 to T7, AC filter 10, and a semiconductor module 25. AC terminals T1 to T3 are used to transmit and receive the three-phase AC voltage. Neutral point terminal T4 of conversion circuit 21 and neutral point terminal T4 of inversion circuit 22 are connected to each other. DC terminals T5 to T7 are used to transmit and receive the positive voltage, the negative voltage and the neutral point voltage, respectively. The neutral point voltage is an intermediate voltage between the positive voltage and the negative voltage.

AC filter 10 is as shown in FIG. 2. AC filter 10 is a low-pass filter, and allows the three-phase AC power of a commercial frequency to pass therethrough and interrupts a signal of a switching frequency generated at semiconductor module 25. Instead of AC filter 10, AC filter 10A in FIG. 3 may be provided.

Semiconductor module 25 includes transistors Q11 to Q16, diodes D11 to D16, and AC switches S1 to S3. Each of transistors Q11 to Q16 is, for example, an N-channel MOS transistor. Drains of transistors Q11 to Q13 are all connected to DC terminal T5, and sources thereof are connected to nodes N1 to N3, respectively. Drains of transistors Q14 to Q16 are connected to nodes N1 to N3, respectively, and sources thereof are all connected to DC terminal T6.

Anodes of diodes D11 to D16 are connected to the sources of transistors Q11 to Q16, respectively, and cathodes thereof are connected to the drains of transistors Q11 to Q16, respectively. Namely, diodes D11 to D16 are connected in antiparallel to transistors Q11 to Q16, respectively.

Each of AC switches S1 to S3 includes transistors Q17 and Q18, and diodes D17 and D18. Each of transistors Q17 and Q18 is, for example, an IGBT. Emitters of transistors Q17 of switches S1 to S3 are connected to nodes N1 to N3, respectively, and emitters of transistors Q18 of switches S1 to S3 are all connected to DC terminal T7. In each of switches S1 to S3, collectors of transistors Q17 and Q18 are connected to each other, and diodes D17 and D18 are connected in antiparallel to transistors Q17 and Q18, respectively.

Each of transistors Q11 to Q18 is PWM controlled by control circuit 24, and is turned on/off at every prescribed timing in synchronization with the three-phase AC voltage from AC power supply 51. For example, transistors Q11 to Q13 are sequentially turned on/off in synchronization with the three-phase AC voltage. During a time period in which transistors Q11 to Q13 are ON, transistors Q14 to Q16 are OFF, and during a time period in which transistors Q11 to Q13 are OFF, transistors Q14 to Q16 are ON.

In conversion circuit 21, AC terminals T1 to T3 receive the three-phase AC voltage from AC power supply 51, and DC terminal T5 is connected to one end of DC positive bus L1 and DC terminal T6 is connected to one end of DC negative bus L2 and DC terminal T7 is connected to one end of DC neutral point bus L3. AC filter 10 allows the three-phase AC power of a commercial frequency supplied from AC power supply 51 to pass through semiconductor module 25, and prevents the signal of a switching frequency generated at semiconductor module 25 from passing through AC power supply 51.

In conversion circuit 21, semiconductor module 25 forms a three-level converter that generates the positive voltage, the negative voltage and the neutral point voltage based on the three-phase AC voltage supplied from AC power supply 51 via AC filter 10, and provides the generated positive voltage, negative voltage and neutral point voltage to DC terminals T5 to T7, respectively.

For example, when a voltage of AC terminal T1 is higher than a voltage of AC terminal T2, transistor Q11 and transistors Q17 and Q18 of switch S2 are turned on and a current flows through a path of AC terminal T1, AC filter 10 (reactor 11), transistor Q11, DC terminal T5, capacitor C11, DC terminal T7, switch S2 (transistors Q18 and Q17), AC filter 10 (reactor 12), and AC terminal T2, and thus, capacitor C11 is charged.

When a voltage of AC terminal T1 is higher than a voltage of AC terminal T3, transistors Q17 and Q18 of switch S1 and transistor Q16 are turned on and a current flows through a path of AC terminal T1, AC filter 10 (reactor 11), switch S1 (transistors Q17 and Q18), DC terminal T7, capacitor C12, DC terminal T6, transistor Q16, AC filter 10 (reactor 13), and AC terminal T3, and thus, capacitor C12 is charged.

In inversion circuit 22, AC terminals T1 to T3 are connected to load 52, and DC terminal T5 is connected to the other end of DC positive bus L1 and DC terminal T6 is connected to the other end of DC negative bus L2 and DC terminal T7 is connected to the other end of DC neutral point bus L3. Semiconductor module 25 forms a three-level inverter that generates the three-phase AC voltages based on the positive voltage, the negative voltage and the neutral point voltage supplied from conversion circuit 21 or bidirectional chopper 23 via buses L1 to L3, and outputs the generated three-phase AC voltages to nodes N1 to N3, respectively. Each of the three-phase AC voltages generated by semiconductor module 25 is, for example, a three-level AC voltage that changes into a positive voltage, a neutral point voltage, a negative voltage, a neutral point voltage, a positive voltage, . . . .

For example, transistor Q11 and transistors Q17 and Q18 of switch S2 are turned on and a current flows through a path of DC terminal T5, transistor Q11, AC filter 10 (reactor 11), AC terminal T1, load 52, AC terminal T2, AC filter 10 (reactor 12), switch S2 (transistors Q17 and Q18), and DC terminal T7, and thus, capacitor C11 is discharged.

Transistors Q17 and Q18 of switch S1 and transistor Q16 are turned on and a current flows through a path of DC terminal T7, switch S1 (transistors Q18 and Q17), AC filter 10 (reactor 11), AC terminal T1, load 52, AC terminal T3, AC filter 10 (reactor 13), transistor Q16, and DC terminal T6, and thus, capacitor C12 is discharged.

In inversion circuit 22, AC filter 10 allows the three-phase AC voltage of a commercial frequency generated by semiconductor module 25 to pass through load 52, and prevents the signal of a switching frequency generated at semiconductor module 25 from passing through load 52. In other words, AC filter 10 of inversion circuit 22 converts the three-phase three-level AC voltage generated by semiconductor module 25 into a three-phase sinusoidal AC voltage and provides the three-phase sinusoidal AC voltage to load 52.

Figure 7:
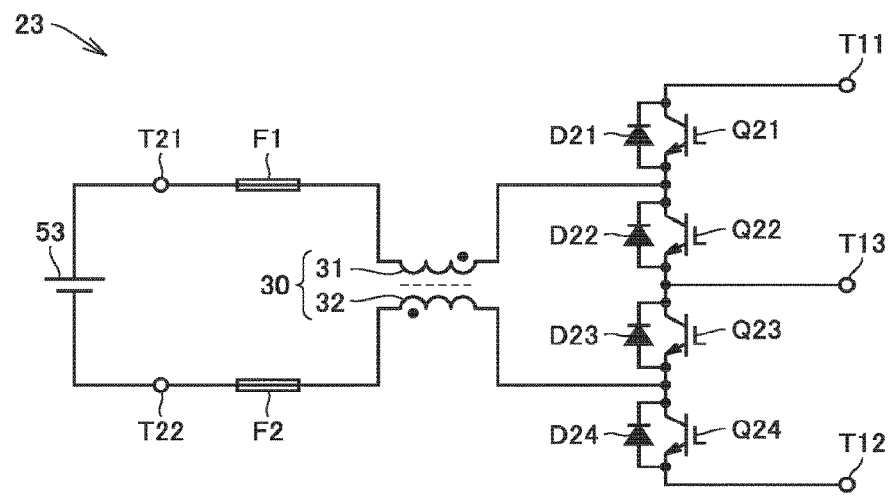
FIG. 7 is a circuit diagram showing a configuration of a bidirectional chopper shown in FIG. 5.

FIG. 7 is a circuit diagram showing a configuration of bidirectional chopper 23. In FIG. 7, bidirectional chopper 23 includes DC terminals T11 to T13, battery terminals T21 and T22, transistors Q21 to Q24, diodes D21 to D24, a normal mode reactor 30, and fuses F1 and F2. Normal mode reactor 30 includes two coils 31 and 32. DC terminals T11 to T13 are connected to DC positive bus L1, DC negative bus L2 and DC neutral point bus L3, respectively. Battery terminals T21 and T22 are connected to a positive electrode and a negative electrode of battery 53, respectively.

Each of transistors Q21 to Q24 is, for example, an IGBT. Transistors Q21 and Q22 are connected in series between DC terminals T11 and T13, and transistors Q23 and Q24 are connected in series between DC terminals T13 and T12. Diodes D21 to D24 are connected in antiparallel to transistors Q21 to Q24, respectively.

One terminal of coil 31 is connected to an emitter of transistor Q21, and the other terminal thereof is connected to battery terminal T21 with fuse F1 interposed therebetween. One terminal of coil 32 is connected to battery terminal T22 with fuse F2 interposed therebetween, and the other terminal thereof is connected to an emitter of transistor Q23. When an overcurrent flows, fuses F1 and F2 are blown to protect battery 53, bidirectional chopper 23 and the like.

In a first battery charging mode, transistors Q22 to Q24 are turned off and transistor Q21 is turned on. As a result, a current flows from DC terminal T11 through transistor Q21, coil 31, fuse F1, battery 53, fuse F2, coil 32, and diode D23 to DC terminal T13, and thus, capacitor C11 is discharged and battery 53 is charged.

In a second battery charging mode, transistors Q22 and Q23 are turned off and transistors Q21 and Q24 are turned on. As a result, a current flows from DC terminal T11 through transistor Q21, coil 31, fuse F1, battery 53, fuse F2, coil 32, and transistor Q24 to DC terminal T12, and thus, capacitors C11 and C12 are discharged and battery 53 is charged.

In a third battery charging mode, transistors Q21 to Q23 are turned off and transistor Q24 is turned on. As a result, a current flows from DC terminal T13 through diode D22, coil 31, fuse F1, battery 53, fuse F2, coil 32, and transistor Q24 to DC terminal T12, and thus, capacitor C12 is discharged and battery 53 is charged.

The first battery charging mode and the third battery charging mode are performed alternately. During a time period between the first battery charging mode and the third battery charging mode, transistors Q21 to Q24 are turned off, and the electromagnetic energy stored in coils 31 and 32 is released, and a current flows through a path of diode D22, coil 31, fuse F1, battery 53, fuse F2, coil 32, and diode D23, and thus, battery 53 is charged. The second battery charging mode is a mode in which the first battery charging mode and the third battery charging mode overlap with each other.

In a first battery discharging mode, transistors Q21, Q23 and Q24 are turned off and transistor Q22 is turned on. As a result, a current flows from the positive electrode of battery 53 through fuse F1, coil 31, transistor Q22, capacitor C12, diode D24, coil 32, and fuse F2 to the negative electrode of battery 53, and thus, battery 53 is discharged and capacitor C12 is charged.

In a second battery discharging mode, transistors Q21 to Q24 are turned off. As a result, a current flows from the positive electrode of battery 53 through fuse F1, coil 31, diode D21, capacitors C11 and C12, diode D24, coil 32, and fuse F2 to the negative electrode of battery 53, and thus, the electromagnetic energy stored in coils 31 and 32 is released, and further, battery 53 is discharged and capacitors C11 and C12 are charged.

In a third battery discharging mode, transistors Q21, Q22 and Q24 are turned off and transistor Q23 is turned on. As a result, a current flows from the positive electrode of battery 53 through fuse F1, coil 31, diode D21, capacitor C11, transistor Q23, coil 32, and fuse F2 to the negative electrode of battery 53, and thus, battery 53 is discharged and capacitor C11 is charged.

The first battery discharging mode and the third battery discharging mode are performed alternately. When a voltage between DC terminals T11 and T12 is lower than a voltage between the terminals of battery 53 during a time period between the first battery discharging mode and the third battery discharging mode, the second battery discharging mode is performed.

Referring again to FIG. 5, the uninterruptible power supply system further includes fuses F11 to F13 and F21 to F23, and wirings L11 to L13 and L21 to L23. Fuse F11 is connected between DC positive buses L1 of uninterruptible power supply devices U11 and U12 by wiring L11. Fuse F12 is connected between DC negative buses L2 of uninterruptible power supply devices U11 and U12 by wiring L12. Fuse F13 is connected between DC neutral point buses L3 of uninterruptible power supply devices U11 and U12 by wiring L13. Fuse F21 is connected between DC positive buses L1 of uninterruptible power supply devices U12 and U13 by wiring L21. Fuse F22 is connected between DC negative buses L2 of uninterruptible power supply devices U12 and U13 by wiring L22. Fuse F23 is connected between DC neutral point buses L3 of uninterruptible power supply devices U12 and U13 by wiring L23.

Fuses F11 and F21 and wirings L11 and L21 connect DC positive buses L1 of uninterruptible power supply devices U11 to U13 to one another, to match the voltages of DC positive buses L1 of uninterruptible power supply devices U11 to U13 with one another. Fuses F12 and F22 and wirings L12 and L22 connect DC negative buses L2 of uninterruptible power supply devices U11 to U13 to one another, to match the voltages of DC negative buses L2 of uninterruptible power supply devices U11 to U13 with one another. Fuses F13 and F23 and wirings L13 and L23 connect DC neutral point buses L3 of uninterruptible power supply devices U11 to U13 to one another, to match the voltages of DC neutral point buses L3 of uninterruptible power supply devices U11 to U13 with one another. As a result, input voltages of inversion circuits 22 of uninterruptible power supply devices U11 to U13 can be matched with one another, and a cross current flowing between the output terminals of inversion circuits 22 of uninterruptible power supply devices U11 to U13 can be suppressed to a small value.

When conversion circuit 21, inversion circuit 22, bidirectional chopper 23 or the like of uninterruptible power supply device U11 or U12 fails and a short circuit occurs between buses L1 and L3 and an overcurrent flows between buses L1, L3 of uninterruptible power supply device U11 and buses L1, L3 of uninterruptible power supply device U12, fuses F11 and F13 are blown to protect the uninterruptible power supply system.

For example, when transistors Q17 and Q18 of switch S1 are turned on in the case where transistor Q11 included in semiconductor module 25 of conversion circuit 21 of uninterruptible power supply device U11 fails and is fixed to a conducting state, a short circuit occurs between buses L1 and L3 by transistors Q11, Q17 and Q18. When buses L1 and L3 of uninterruptible power supply device U11 are short-circuited, an overcurrent flows, for example, from the positive side electrode of capacitor C11 of uninterruptible power supply device U12 through fuse F11, the short-circuited portion (transistors Q11, Q17 and Q18) of uninterruptible power supply device U11, and fuse F13 to the negative side electrode of capacitor C11 of uninterruptible power supply device U12, and thus, at least one of fuses F11 and F13 is blown and the overcurrent is interrupted.

When conversion circuit 21, inversion circuit 22 or the like of uninterruptible power supply device U11 or U12 fails and a short circuit occurs between buses L2 and L3 and an overcurrent flows between buses L2, L3 of uninterruptible power supply device U11 and buses L2, L3 of uninterruptible power supply device U12, fuses F12 and F13 are blown to protect the uninterruptible power supply system.

When conversion circuit 21, inversion circuit 22 or the like of uninterruptible power supply device U11 or U12 fails and a short circuit occurs between buses L1 and L2 and an overcurrent flows between buses L1, L2 of uninterruptible power supply device U11 and buses L1, L2 of uninterruptible power supply device U12, fuses F11 and F12 are blown to protect the uninterruptible power supply system.

Similarly, when conversion circuit 21, inversion circuit 22 or the like of uninterruptible power supply device U12 or U13 fails and a short circuit occurs between buses L1 and L3 and an overcurrent flows between buses L1, L3 of uninterruptible power supply device U12 and buses L1, L3 of uninterruptible power supply device U13, fuses F21 and F23 are blown to protect the uninterruptible power supply system.

When conversion circuit 21, inversion circuit 22 or the like of uninterruptible power supply device U12 or U13 fails and a short circuit occurs between buses L2 and L3 and an overcurrent flows between buses L2, L3 of uninterruptible power supply device U12 and buses L2, L3 of uninterruptible power supply device U13, fuses F22 and F23 are blown to protect the uninterruptible power supply system.

When conversion circuit 21, inversion circuit 22 or the like of uninterruptible power supply device U12 or U13 fails and a short circuit occurs between buses L1 and L2 and an overcurrent flows between buses L1, L2 of uninterruptible power supply device U12 and buses L1, L2 of uninterruptible power supply device U13, fuses F21 and F22 are blown to protect the uninterruptible power supply system.

When the uninterruptible power supply system is normal, a current flowing through each of fuses F11 to F13 and F21 to F23 is sufficiently smaller than a rated current of each of uninterruptible power supply devices U11 to U13. Therefore, a rated interrupting current value of each of fuses F11 to F13 and F21 to F23 is selected to be smaller than a rated current value of each of uninterruptible power supply devices U11 to U13. When the current flowing through fuse F exceeds the rated interrupting current value, fuse F is blown and the current flowing through fuse F is interrupted.

Furthermore, an allowable current value of wirings L11 and L21 for connecting fuses F11 and F21 to DC positive bus L1 is selected to be smaller than an allowable current value of DC positive bus L1. An allowable current value of wirings L12 and L22 for connecting fuses F12 and F22 to DC negative bus L2 is selected to be smaller than an allowable current value of DC negative bus L2. An allowable current value of wirings L13 and L23 for connecting fuses F13 and F23 to DC neutral point bus L3 is selected to be smaller than an allowable current value of DC neutral point bus L3. When the current flowing through the wiring exceeds the allowable current value, the wiring generates heat.

Next, the operation of this uninterruptible power supply system will be described. At the normal time when the three-phase AC power is normally supplied from AC power supply 51, the three-phase AC power from AC power supply 51 is converted into the DC power by conversion circuit 21 in each of uninterruptible power supply devices U11 to U13. The DC power generated by conversion circuit 21 is stored in battery 53 by bidirectional chopper 23, and further, the DC power is converted into the three-phase AC power by inversion circuit 22 and the three-phase AC power is supplied to load 52.

At the time of a power failure when supply of the three-phase AC power from AC power supply 51 is stopped, the operation of conversion circuit 21 is stopped in each of uninterruptible power supply devices U11 to U13. The DC power of battery 53 is supplied to inversion circuit 22 via bidirectional chopper 23 and converted into the three-phase AC power and the three-phase AC power is supplied to load 52. Therefore, the operation of load 52 can be continued during a time period in which the DC power is stored in battery 53.

In this second embodiment, DC positive buses L1 of uninterruptible power supply devices U11 to U13 are connected to one another and DC negative buses L2 thereof are connected to one another and DC neutral point buses L3 thereof are connected to one another and the DC voltages input to inversion circuits 22 of uninterruptible power supply devices U11 to U13 are uniform. Therefore, a cross current flowing between the output terminals of inversion circuits 2 of uninterruptible power supply devices U11 to U13 is suppressed to a small value.

For example, when conversion circuit 21 of uninterruptible power supply device U11 fails and a short circuit occurs between buses L1 and L3, at least one of fuses F11 and F13 is blown and buses L1 and L2 of uninterruptible power supply device U11 are electrically separated from buses L1 and L2 of uninterruptible power supply devices U12 and U13. Therefore, even when one of three uninterruptible power supply devices U11 to U13 connected in parallel fails, a failure of the other uninterruptible power supply devices can be prevented and the failure range of the uninterruptible power supply system can be narrowly limited.

Furthermore, the rated interrupting current value of each of fuses F11 to F13 and F21 to F23 is selected to be smaller than the rated current value of each of uninterruptible power supply devices U11 to U13. The allowable current value of wirings L11 and L21 for connecting fuses F11 and F21 to DC positive bus L1 is selected to be smaller than the allowable current value of DC positive bus L1. The allowable current value of wirings L12 and L22 for connecting fuses F12 and F22 to DC negative bus L2 is selected to be smaller than the allowable current value of DC negative bus L2. The allowable current value of wirings L13 and L23 for connecting fuses F13 and F23 to DC neutral point bus L3 is selected to be smaller than the allowable current value of DC neutral point bus L3. Therefore, inexpensive and small-sized fuse F can be used, and inexpensive and thin wirings L11 to L13 and L21 to L23 can be used, and thus, reduction in size of the device, reduction in cost and simplification of the wiring work can be achieved.

In this second embodiment, description has been given to the case in which the present invention is applied to the uninterruptible power supply system including three uninterruptible power supply devices U11 to U13 connected in parallel. However, the present invention is not limited thereto. It goes without saying that the present invention is applicable to an uninterruptible power supply system including N uninterruptible power supply devices connected in parallel. N is an integer equal to or larger than 2. In this case, fuse Fn1 is connected between DC positive bus L1 of an n-th uninterruptible power supply device U1n and DC positive bus L1 of a (n+1)-th uninterruptible power supply device U1(n+1), and fuse Fn2 is connected between DC negative bus L2 of n-th uninterruptible power supply device U1n and DC negative bus L2 of (n+1)-th uninterruptible power supply device U1(n+1), and a fuse Fn3 is connected between DC neutral point bus L3 of n-th uninterruptible power supply device U1n and DC neutral point bus L3 of (n+1)-th uninterruptible power supply device U1(n+1). n is an integer equal to or larger than 1 and equal to or smaller than (N−1).

Furthermore, in this second embodiment, fuse Fn1 is connected between two DC positive buses L1, and fuse Fn2 is connected between two DC negative buses L2, and fuse Fn3 is connected between two DC neutral point buses L3. However, the present invention is not limited thereto. Any one fuse F of three fuses Fn1, Fn2 and Fn3 may be replaced with a mere wiring. For example, fuse Fn1 may be connected between two DC positive buses L1, and fuse Fn2 may be connected between two DC negative buses L2, and two DC neutral point buses L3 may be connected only by a wiring Ln3. Alternatively, fuse Fn1 may be connected between two DC positive buses L1, and two DC negative buses L2 may be connected only by wiring Ln2, and fuse Fn3 may be connected between two DC neutral point buses L3. Alternatively, two DC positive buses L1 may be connected only by wiring Ln1, and fuse Fn2 may be connected between two DC negative buses L2, and fuse Fn3 may be connected between two DC neutral point buses L3.

Furthermore, in this second embodiment, description has been given to the uninterruptible power supply system including the plurality of uninterruptible power supply devices U11 to U13. However, it goes without saying that the uninterruptible power supply device may be rephrased into a power conversion circuit, a power converting unit, an uninterruptible power supply circuit, or an uninterruptible power supply unit, and the uninterruptible power supply system may be rephrased into an uninterruptible power supply device. The plurality of uninterruptible power supply devices U11 to U13 may be housed in separate housings, or the plurality of uninterruptible power supply devices U11 to U13 may be housed in one housing.

Figure 8:
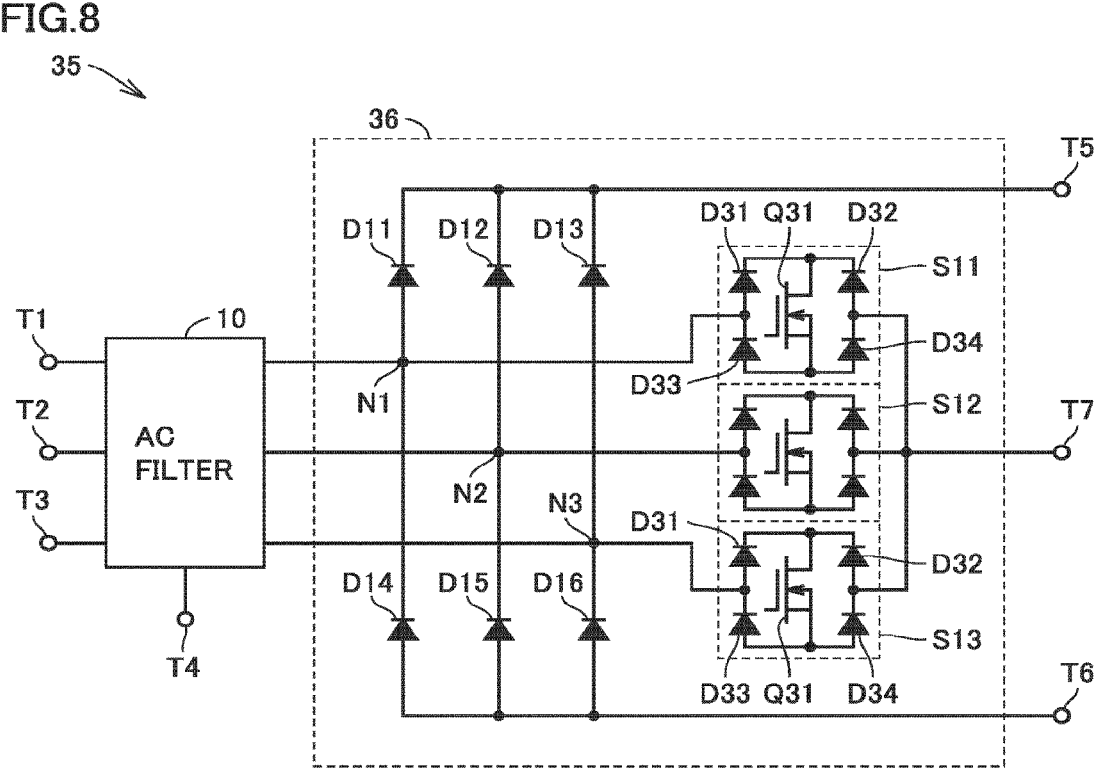
FIG. 8 is a circuit diagram showing a modification of the second embodiment.

FIG. 8 is a circuit block diagram showing a main portion of an uninterruptible power supply system which is a modification of the second embodiment, and FIG. 8 is contrasted with FIG. 6. A difference between this modification and the second embodiment is that conversion circuit 21 in each of uninterruptible power supply devices U11 to U13 is replaced with a conversion circuit 35. In FIG. 8, conversion circuit 35 includes AC terminals T1 to T3, neutral point terminal T4, DC terminals T5 to T7, AC filter 10, and a semiconductor module 36. AC terminals T1 to T3 receive the three-phase AC voltage supplied from AC power supply 51. Neutral point terminal T4 is connected to neutral point terminal T4 of inversion circuit 22. DC terminals T5 to T7 are connected to one ends of DC positive bus L1, DC negative bus L2 and DC neutral point bus L3, respectively.

AC filter 10 is as shown in FIG. 2. AC filter 10 is a low-pass filter, and allows the three-phase AC power of a commercial frequency supplied from AC power supply 51 to pass through semiconductor module 36 and prevents a signal of a switching frequency generated at semiconductor module 36 from passing through the AC power supply 51 side. Instead of AC filter 10, AC filter 10A in FIG. 3 may be provided.

Semiconductor module 36 includes diodes D11 to D16 and AC switches S11 to S13. Anodes of diodes D11 to D13 are connected to nodes N1 to N3, respectively, and cathodes thereof are all connected to DC terminal T5. Anodes of diodes D14 to D16 are all connected to DC terminal T6, and cathodes thereof are connected to nodes N1 to N3, respectively.

Each of AC switches S11 to S13 includes a transistor Q31 and diodes D31 to D34. Anodes of diodes D31 of AC switches S11 to S13 are connected to nodes N1 to N3, respectively, and anodes of diodes D32 thereof are all connected to DC terminal T7. Cathodes of diodes D33 of AC switches S11 to S13 are connected to nodes N1 to N3, respectively, and cathodes of diodes D34 thereof are all connected to DC terminal T7. In each of AC switches S11 to S13, the cathodes of diodes D31 and D32 are connected to each other, and the anodes of diodes D33 and D34 are connected to each other, and a drain of transistor Q31 is connected to the cathodes of diodes D31 and D32, and a source of transistor Q31 is connected to the anodes of diodes D33 and D34.

Each of transistors Q31 of AC switches S11 to S13 is PWM controlled by control circuit 24, and is turned on/off at every prescribed timing in synchronization with the three-phase AC voltage from AC power supply 51. For example, transistors Q31 of AC switches S11 to S13 are sequentially turned on/off in synchronization with the three-phase AC voltage. Semiconductor module 36 forms a three-level converter that generates a positive voltage, a negative voltage and a neutral point voltage based on the three-phase AC voltage supplied from AC power supply 51 via AC filter 10, and provides the generated positive voltage, negative voltage and neutral point voltage to DC terminals T5 to T7, respectively.

For example, when a voltage of AC terminal T1 is higher than a voltage of AC terminal T2, transistor Q31 of switch S12 is turned on and a current flows through a path of AC terminal T1, AC filter 10 (reactor 11), diode D11, DC terminal T5, capacitor C11, DC terminal T7, AC switch S12 (diode D32, transistor Q31 and diode D33), AC filter 10 (reactor 12), and AC terminal T2, and thus, capacitor C11 is charged.

When a voltage of AC terminal T1 is higher than a voltage of AC terminal T3, transistor Q31 of switch S11 is turned on and a current flows through a path of AC terminal T1, AC filter 10 (reactor 11), switch S11 (diode D31, transistor Q31 and diode D34), DC terminal T7, capacitor C12, DC terminal T6, diode D16, AC filter 10 (reactor 13), and AC terminal T3, and thus, capacitor C12 is charged.

Since the remaining configuration and operation are the same as those of the second embodiment, description thereof will not be repeated. In this modification, the same effect as that of the second embodiment can be obtained, and the configuration and control of conversion circuit 35 can be simplified.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power conversion system, comprising:
   first to N-th power converters connected in parallel to a load; and
   first to (N−1)-th fuses, N being an integer equal to or larger than 2,
   each power converter including:
   a conversion circuit for converting an AC voltage into a DC voltage;
   an inversion circuit for converting the DC voltage into an AC voltage and providing the AC voltage to said load;
   a DC bus for supplying the DC voltage from said conversion circuit to said inversion circuit; and
   a capacitor connected to said DC bus, for smoothing the DC voltage,
   wherein an n-th fuse is connected between said DC bus of an n-th power converter and said DC bus of a (n+1)-th power converter by an n-th wiring, and n is an integer equal to or larger than 1 and equal to or smaller than (N−1),
   wherein a fuse other than said n-th fuse is not connected on said n-th wiring between said DC bus of said n-th power converter and said DC bus of bus of said (n+1)-th power converter, and
   wherein if a failure occurs in one of said n-th or (n+1)-th power converter, said n-th fuse is configured to protect other one of said n-th or (n+1)-th power converter.

2. The power conversion system according to claim 1, wherein, if said failure occurs in said one of n-th or (n+1)-th power converter, said n-th fuse is blown by a current flowing on said n-th wiring between said DC bus of said n-th power converter and said DC bus of said (n+1)-th power converter.

3. The power conversion system according to claim 1, wherein
   a rated interrupting current value of said n-th fuse is smaller than a rated current value of each of said n-th and (n+1)-th power converters.

4. The power conversion system according to claim 1, further comprising
   first to (N−1)-th wirings provided to correspond to said first to (N−1)-th fuses, respectively, wherein
   said n-th fuse is connected between said DC bus of said n-th power converter and said DC bus of said (n+1)-th power converter by said n-th wiring, and
   an allowable current value of said n-th wiring is smaller than an allowable current value of said DC bus.

5. The power conversion system according to claim 1, wherein
   each power converter includes two DC buses,
   said capacitor is connected between said two DC buses,
   said conversion circuit generates a positive voltage and a negative voltage as the DC voltage, and provides said generated positive voltage and said generated negative voltage to said inversion circuit via said two DC buses, respectively,
   said inversion circuit generates the AC voltage based on said positive voltage and said negative voltage, and provides the generated AC voltage to said load,
   said power conversion system includes two sets of first to (N−1)-th fuses and two sets of first to (N−1)-th wirings, and
   one terminals of two n-th fuses are connected to said two DC buses of said n-th power converter by each of two n-th wirings, respectively, and the other terminals of said two n-th fuses are connected to said two DC buses of said (n+1)-th power converter by each of two n-th wirings, respectively.

6. The power conversion system according to claim 1, wherein
   each power converter includes three DC buses and two capacitors,
   said conversion circuit generates a positive voltage, a neutral point voltage and a negative voltage as the DC voltage, and provides said generated positive voltage, said generated neutral point voltage and said generated negative voltage to said inversion circuit via said three DC buses, respectively,
   said inversion circuit generates the AC voltage based on said positive voltage, said neutral point voltage and said negative voltage, and provides the generated AC voltage to said load,
   one electrodes of said two capacitors are connected to two DC buses for supplying said positive voltage and said neutral point voltage, respectively, and the other electrodes of said two capacitors are connected to two DC buses for supplying said neutral point voltage and said negative voltage, respectively, said power conversion system includes three sets of first to (N−1)-th fuses, and one terminals of three n-th fuses are connected to said three DC buses of said n-th power converter, respectively, and the other terminals of said three n-th fuses are connected to said three DC buses of said (n+1)-th power converter, respectively.

7. The power conversion system according to claim 1, wherein at the normal time when AC power is supplied from an AC power supply, the AC power from said AC power supply is converted into DC power by said conversion circuit and the DC power is supplied to a power storage device, and further, the DC power is converted into AC power by said inversion circuit and the AC power is supplied to said load, and at the time of a power failure when supply of the AC power from said AC power supply is stopped, the DC power of said power storage device is converted into the AC power by said inversion circuit and the AC power is supplied to said load.

8. The power conversion system according to claim 7, wherein each of said power converters further includes a bidirectional chopper that supplies the DC power generated by said conversion circuit to said power storage device at said normal time, and supplies the DC power of said power storage device to said inversion circuit at the time of said power failure.

9. The power conversion system according to claim 8, wherein said failure includes at least one of a failure of said conversion circuit, a failure of said inversion circuit, and a failure of said bidirectional choppoer.

10. The power conversion system according to claim 1, wherein each power converter includes two DC buses, said capacitor is connected between said two DC buses, said conversion circuit generates a positive voltage and a negative voltage as the DC voltage, and provides said generated positive voltage and said generated negative voltage to said inversion circuit via said two DC buses, respectively, said inversion circuit generates the AC voltage based on said positive voltage and said negative voltage, and provides the generated AC voltage to said load, said power conversion system includes two sets of first to (N−1)-th wirings, and said n-th fuse is connected to between one of said two DC buses of said n-th power converter which corresponds to said positive voltage and one of said two DC buses of said (n+1)-th power converter which corresponds to said positive voltage by one of said two sets of n-th wirings, and said the other one of said two sets of n-th wirings connects the other one of said two DC buses of said n-th power converter which corresponds to said negative voltage and the other one of said said two DC buses of said (n+1)-th power converter which corresponds to said negative voltage without said n-th fuse.

11. The power conversion system according to claim 1, wherein each power converter includes two DC buses, said capacitor is connected between said two DC buses, said conversion circuit generates a positive voltage and a negative voltage as the DC voltage, and provides said generated positive voltage and said generated negative voltage to said inversion circuit via said two DC buses, respectively, said inversion circuit generates the AC voltage based on said positive voltage and said negative voltage, and provides the generated AC voltage to said load, said power conversion system includes two sets of first to (N−1)-th wirings, and said n-th fuse is connected to between one of said two DC buses of said n-th power converter which corresponds to said negative voltage and one of said two DC buses of said (n+1)-th power converter which corresponds to said negative voltage by one of said two sets of n-th wirings, and said the other one of said two sets of n-th wirings connects the other one of said two DC buses of said n-th power converter which corresponds to said positive voltage and the other one of said said two DC buses of said (n+1)-th power converter which corresponds to said positive voltage without said n-th fuse.

* * * * *